(12) United States Patent
Beach

(10) Patent No.: US 9,476,429 B2
(45) Date of Patent: Oct. 25, 2016

(54) FLOW FEED DIFFUSER

(71) Applicant: UNITED TECHNOLOGIES CORPORATION, Farmington, CT (US)

(72) Inventor: Brian Beach, East Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 788 days.

(21) Appl. No.: 13/719,748

(22) Filed: Dec. 19, 2012

(65) Prior Publication Data

US 2014/0212281 A1    Jul. 31, 2014

(51) Int. Cl.
| F23R 3/00 | (2006.01) |
| F04D 29/00 | (2006.01) |
| F01D 25/12 | (2006.01) |
| F23R 3/04 | (2006.01) |

(52) U.S. Cl.
CPC ............. *F04D 29/002* (2013.01); *F01D 25/12* (2013.01); *F23R 3/04* (2013.01); *F23R 2900/03044* (2013.01); *Y02T 50/675* (2013.01)

(58) Field of Classification Search
CPC ..................... F23R 2900/03044; F23R 3/002; F23R 3/02; F23R 3/04; F23R 3/045; F04D 29/002; F01D 25/12; F02C 7/18; F02C 7/185; Y02T 50/675
See application file for complete search history.

(56) References Cited

U.S. PATENT DOCUMENTS

| 2,594,042 A | 4/1952 | Lee |
| 3,123,285 A | 3/1964 | Lee |
| 3,915,387 A | 10/1975 | Caruel et al. |
| 4,527,386 A | 7/1985 | Markowski |
| 5,555,721 A | 9/1996 | Bourneuf et al. |
| 5,592,821 A | 1/1997 | Alary et al. |
| 6,272,865 B1 * | 8/2001 | Clark et al. ..................... 60/748 |
| 6,334,297 B1 | 1/2002 | Dailey et al. |
| 7,784,999 B1 | 8/2010 | Lott |
| 8,069,669 B2 * | 12/2011 | Pieussergues et al. ......... 60/752 |
| 8,276,391 B2 * | 10/2012 | Berry ....................... F23R 3/04 60/752 |
| 8,572,982 B2 * | 11/2013 | Tiemann ....................... 60/751 |
| 9,046,269 B2 * | 6/2015 | Smith ....................... F01D 5/186 |
| 9,181,807 B2 * | 11/2015 | Kuwabara ............... F01D 5/187 |
| 2003/0039537 A1 * | 2/2003 | Itzel ....................... F01D 5/187 415/1 |
| 2004/0011043 A1 | 1/2004 | Pidcock et al. |
| 2007/0227150 A1 | 10/2007 | Alkabie et al. |
| 2010/0236256 A1 * | 9/2010 | Hussain ..................... F02C 6/08 60/785 |
| 2010/0257869 A1 | 10/2010 | Cornelius et al. |
| 2011/0214428 A1 * | 9/2011 | Shershnyov ............. F23R 3/06 60/754 |
| 2013/0000312 A1 * | 1/2013 | Kodukulla .............. F23R 3/005 60/772 |

(Continued)

FOREIGN PATENT DOCUMENTS

| EP | 1983265 A2 | 10/2008 |
| EP | 2562479 | 8/2012 |

OTHER PUBLICATIONS

Supplementary Partial European Search Report; Application No. 13868412.1; Date of Mailing: Mar. 18, 2016; 9 pages.

*Primary Examiner* — Craig Kim
(74) *Attorney, Agent, or Firm* — Cantor Colburn LLP

(57) ABSTRACT

A feed diffuser is disclosed. The diffuser may comprise a base disposed orthogonal to a flow, a body extending from the base toward the flow, and an apex provided at a termination of the body in a direction toward the flow. The body may decrease in cross-sectional area from the base to the apex.

18 Claims, 4 Drawing Sheets

(56) References Cited

U.S. PATENT DOCUMENTS

2013/0091848 A1* 4/2013 Manoharan ............... F23R 3/54
60/752

2013/0180252 A1* 7/2013 Chen ....................... F23R 3/002
60/754

* cited by examiner

FLOW FEED DIFFUSER

STATEMENT OF GOVERNMENT INTEREST

The United States Government has certain rights in this invention pursuant to contract number FA8611-08-C-2897 between the United States Air Force and United Technologies Corporation.

FIELD OF THE DISCLOSURE

The present disclosure relates generally to flow feed systems of gas turbine engines and, more particularly, to a diffuser for such flow feed systems.

BACKGROUND OF THE DISCLOSURE

In order to cool parts sustaining extremely high temperatures, systems providing cooling flow to the part may be utilized. For example, in a gas turbine engine, various parts of the combustor are exposed to hot combustion gases. Coolant may be supplied to these parts, such as a combustor liner, in order to cool the part and prevent degradation in engine performance or damage to engine parts that may occur from prolonged exposure to such hot gases.

However, the coolant often impinges against the liners at an area directly under the coolant supply. This creates an unintended pressure drop in the coolant air flow. As a result, the coolant may not be able to effectively cool the other areas of the liner due to the loss of pressure or momentum to provide coolant flow to these other areas of the liner.

Accordingly, there exists a need for a diffuser that can reduce the pressure drop from the coolant supply to the impinged part and thus provide improved coolant flow to the parts experiencing sustained high temperatures.

SUMMARY OF THE DISCLOSURE

According to one embodiment of the present disclosure, a feed diffuser is disclosed. The diffuser may comprise a base disposed orthogonal to a flow, a body extending from the base toward the flow, and an apex provided at a termination of the body in a direction toward the flow. The body may decrease in cross-sectional area from the base to the apex.

In a refinement, a surface of the body may converge from the base to the apex and smoothly diffuse the flow.

In a related refinement, the surface may have a concave shape.

In another refinement, the base may have a generally circular shape.

In a related refinement refinement, the apex may be a conical point.

In a related refinement, the apex and a center of the base may be aligned with a central axis of the flow.

In another refinement, the base may be mounted on a surface of a liner.

In another refinement, the feed diffuser may further comprise a plurality of spacers extending from the base. The spacers may be configured to mount the base to an impingement sheet at a distance from the impingement sheet.

In a related refinement, the flow may exit from a coolant supply tube situated within a pressure sheet. The pressure sheet and the impingement sheet may define a plenum.

In a related refinement, the plenum may be a coolant air flow passage between a combustor shell and a combustor liner of a combustor of a gas turbine engine.

According to another embodiment, a system for providing flow to a target sheet is disclosed. The system may comprise a coolant supply source configured to provide a flow in an orthogonal projection onto the target sheet, and a diffuser having a body with a downstream end mounted on the target sheet and an upstream end facing the flow. The diffuser may increase in cross-sectional area from the upstream end to the downstream end.

In a refinement, the coolant supply source may be a compressor of a gas turbine engine and the target sheet may be a liner of a combustor of a gas turbine engine.

In another refinement, the diffuser may have a central axis aligned with a central axis of the flow.

In yet another refinement, the upstream end may comprise an apex, and a surface of the body may diverge from the upstream end to the downstream end in an arcuate shape.

In a related refinement, the surface may be concaved from the upstream end to the downstream end thereby smoothly distributing the flow to the target sheet.

According to yet another embodiment, a combustor is disclosed. The combustor may comprise a shell having impingement holes, a liner, and at least one diffuser mounted on the liner directly under one of the impingement holes in the shell.

In a refinement, the at least one diffuser may smoothly diffuser a flow from the impingement hole.

In a related refinement, the at least one diffuser may have a generally arcuate shape.

In another related refinement, the liner may have holes, and the at least one diffuser may have a plurality of spacers for preventing blockage of the holes in the liner.

In yet another refinement, the at least one diffuser may decrease in cross-sectional area from a base to an apex.

These and other aspects and features of the disclosure will become more readily apparent upon reading the following detailed description when taken in conjunction with the accompanying drawings.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION

Figure 1:
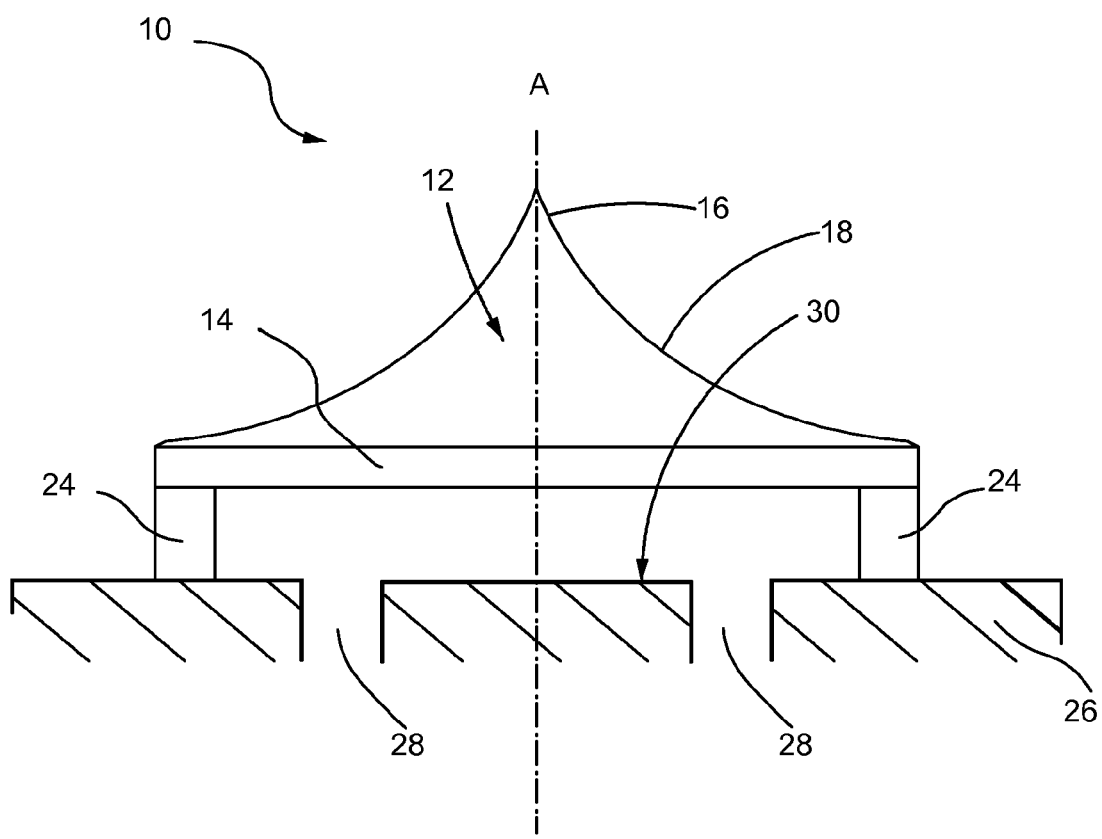
FIG. 1 is a schematic cross-sectional view of a feed diffuser according to one embodiment of the present disclosure.

Referring now to the drawings, and with specific reference to FIG. 1, in accordance with the teachings of the disclosure, an exemplary feed diffuser 10 is shown. The diffuser 10 may generally comprise a body 12 having a base 14 and an apex 16. Although other shapes are certainly possible, the body 12 may have a generally conical shape with the base 14 being substantially circular or cylindrical and the apex 16 comprising a point or spike. Decreasing in cross-sectional area from the base 14 to the apex 16, the body 12 has a surface 18 that converges from the base 14 to the apex 16 in a generally arcuate or concave shape. The body 12 also has a central axis A extending through the base 14 and the apex 16.

Figure 2:
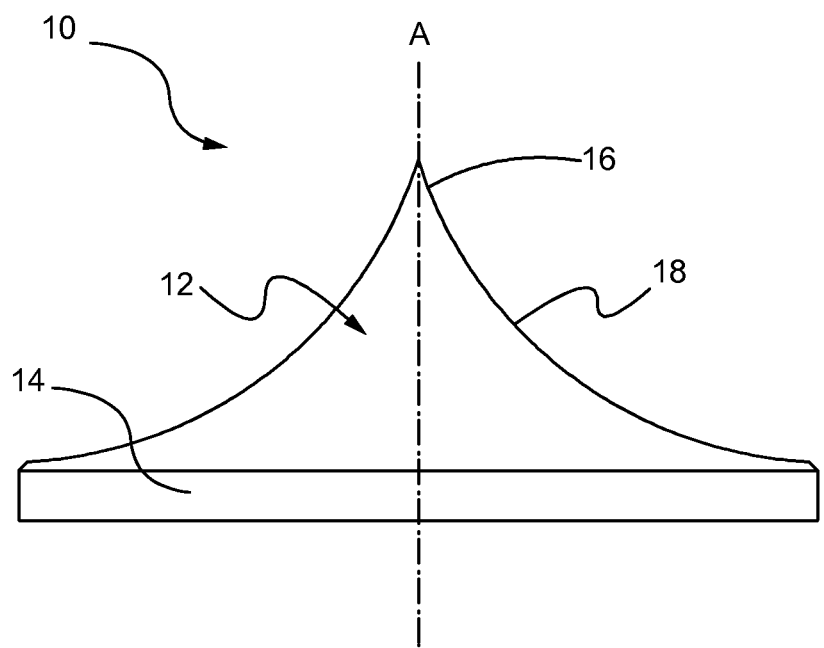
FIG. 2 is a schematic cross-sectional view of a feed diffuser according to an alternate embodiment of the present disclosure.

A plurality of spacers 24 may extend from the base 14. Each of the spacers 24 may be configured to mount the diffuser 10 to a liner 26, with the base 14 separated at a distance from the liner 26. The sheet 26 may have a plurality of holes 28 through which air flow passes. By providing a distance between a surface 30 of the liner 26 and the base 14 of the diffuser 10, spacers 24 prevent blockage of the holes 28 and allow air to flow, unobstructed, through the holes 28. Although shown with spacers 24, it will be understood that the diffuser 10 may not have spacers, as shown in FIG. 2, without departing from the scope of this disclosure.

Figure 3:
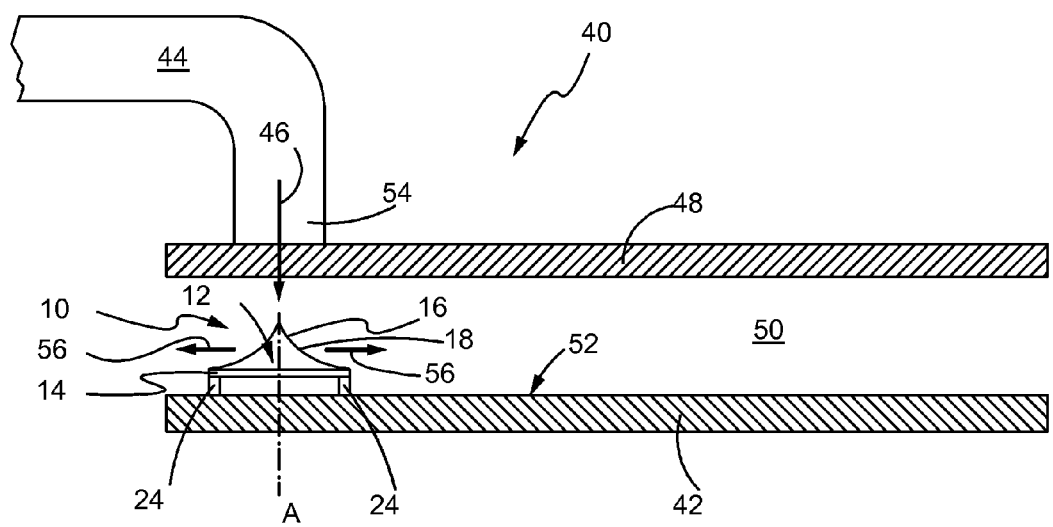
FIG. 3 is a schematic cross-section view of a system for providing flow to a target sheet according to another embodiment of the present disclosure.

Turning now to FIG. 3, the diffuser 10 may be part of a system 40 for providing flow to a target sheet or liner 42, according to another embodiment of the present disclosure. The system 40 may also include a coolant supply source 44 configured to provide a coolant flow, indicated by arrow 46, in an orthogonal direction onto the liner 42. The coolant supply source 44 may comprise a coolant supply tube situated within a pressure sheet 48. The pressure sheet 48 and the liner 42 may define a plenum 50 through which the flow 46 is dispersed.

The diffuser 10 may be positioned on the target sheet directly under the flow 46. More specifically, the central axis A of the body 12 may be aligned with a central axis of the flow 46 coming from the coolant supply source 44. The base 14 of the diffuser 10 may be disposed orthogonal to the flow 46, with the body extending from the base 14 toward the flow 46. The apex 16 may be upstream of the flow 46, while the base 14 may be downstream of the flow 46. The spacers 24 of the diffuser 10 may be mounted to a surface 52 of the liner 42. The apex 16 may be proximal to a feed 54 of the coolant supply source 44. By placing the diffuser 10 at a location where the flow 46 from the feed 54 of the coolant supply source 44 directly impinges on the liner 42, a curved surface 18 of the body 12 may smoothly diffuse and direct the flow 46 in a radially outward direction, as indicated by arrows 56, thereby reducing a pressure drop of the flow 16 throughout the plenum 50 and conserving a momentum or pressure of the flow 56 along the surface 52 of the liner 42.

The diffuser of the present disclosure can be used on any number of different applications including, but not limited to, aerospace components such as gas turbine engines and airfoils. For example, turning now to FIGS. 4 & 5, a sectional view of a gas turbine engine 155 using a diffuser 110 is shown, in accordance with the teachings of this disclosure. The gas turbine engine 155 may include a combustor 157, which mixes and ignites pressurized air from a compressor with fuel from a fuel injector 158, thereby generating hot combustion gases. A turbine downstream of the combustor 157 extracts power from the hot combustion gases. The combustor 157 may comprise an inner liner 159 and an outer liner 160, which collectively define a combustion chamber 161. An inner combustor shell 162 and an outer combustor shell 163 surround the liners 159, 160 and thereby define an air flow passage 164 between the liner and the shell. An igniter 165 may be provided through the outer combustor shell 163 and outer liner 160 to ignite the fuel and air mixture in the combustion chamber 161.

Figure 4:
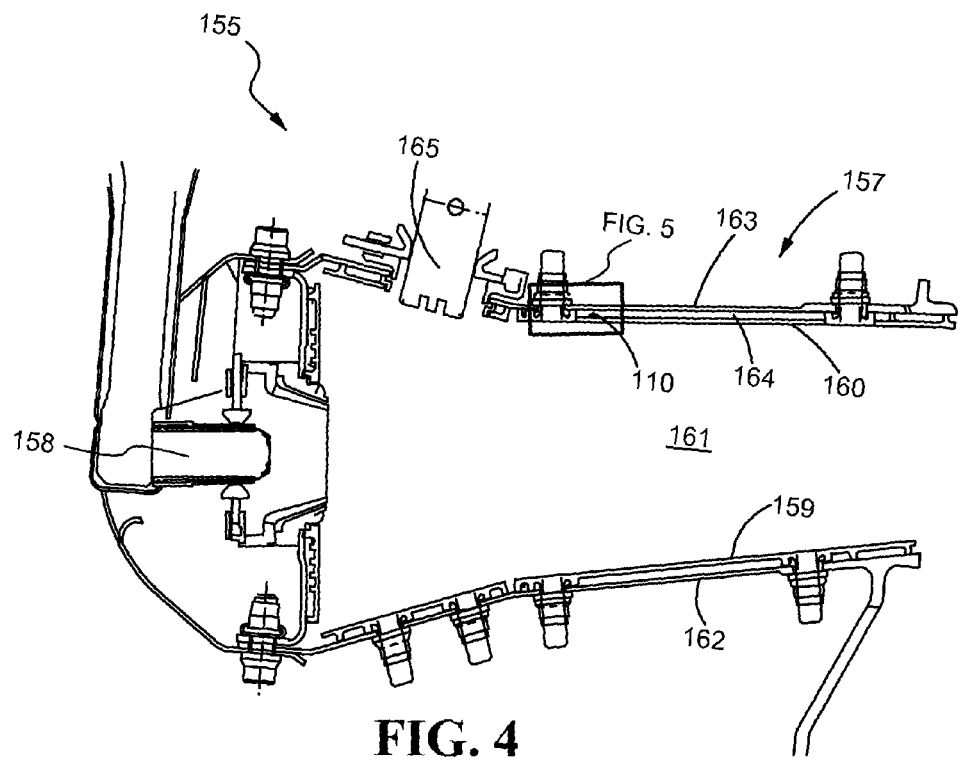
FIG. 4 is a sectional view of a gas turbine engine using a feed diffuser in accordance with the teachings of this disclosure.
Figure 5:
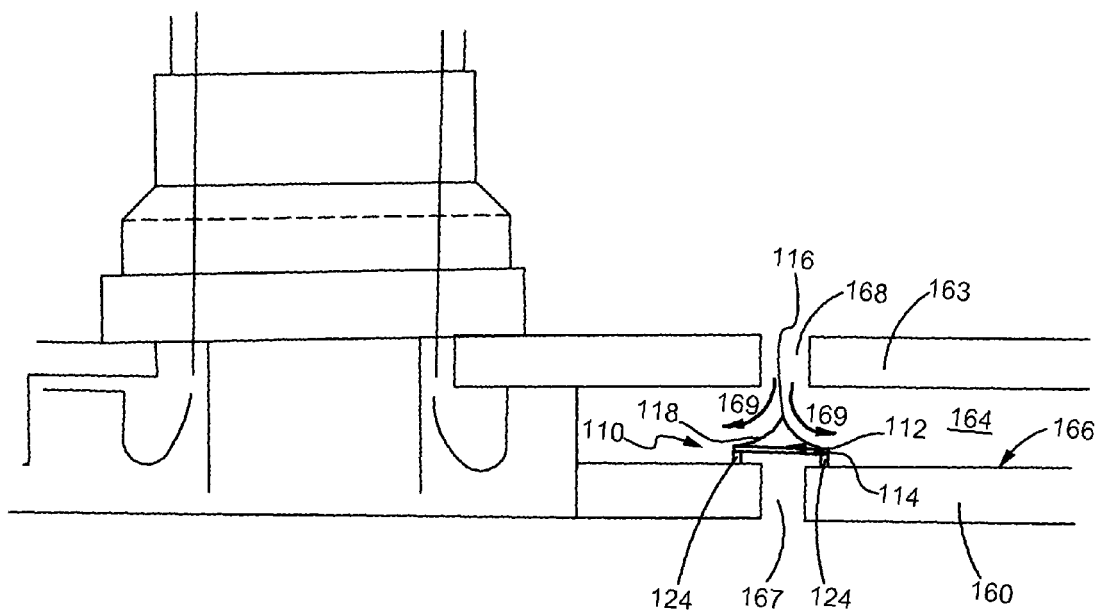
FIG. 5 is an enlarged view of a portion of a combustor of the gas turbine engine of FIG. 4.

At least one diffuser 110 may be mounted between the liners 159, 160 and the combustor shells 162, 163 to smoothly distribute cooling air flow throughout the air flow passage 164. For example, as shown in FIGS. 4 & 5, the diffuser 110 may be mounted, by way of spacers 124, to the outer liner 160. The spacers 124 of the diffuser 110 may provide a distance between a surface 166 of the liner 160 and the base 114 of the diffuser 110 to prevent blockage of effusion holes 167 in the liner 160. The apex 116 of the diffuser 110 may be centered under an impingement hole 168 in the outer combustor shell 163. The impingement hole 168 of the shell 163 may allow pressurized air from the compressor to enter the flow passage 164 and impinge on the liner 160 in order to cool the liner 160. The curved surface 118 of the body 112 of the diffuser 110 may smoothly diffuse and direct an air flow 169 coming from the impingement hole 168 in a radially outward direction, thereby reducing a pressure drop of the flow 169 throughout the air flow passage 164 and conserving a momentum of the flow 169 along the surface 166 of the liner 160.

Although the diffuser 110 is shown as part of the combustor 157, it will be understood that the diffuser 110 may be utilized in other parts of a gas turbine engine, such as, including but not limited to, in an augmentor, between a nozzle and a sidewall. It will also be understood that the diffuser 110 is not limited to gas turbine engines, but may be used in any application to diffuse flow from a source. For example, the diffuser 110 may be used on an aircraft airfoil wing under a coolant supply configured to cool the wing of the aircraft.

INDUSTRIAL APPLICABILITY

From the foregoing, it can be seen that the teachings of this disclosure can find industrial application in any number of different situations, including but not limited to, cooling systems. Such cooling systems may be used to provide coolant flow to parts sustaining high temperatures. For example, such cooling systems may be utilized for cooling parts of land, marine, or aircraft applications, such as in gas turbine engines. Specific examples of applicability may include combustors, combustor liners, and combustor shells of a gas turbine engine.

The disclosure described provides an improved and efficient feed diffuser for cooling systems. By providing the disclosed diffuser at a feed of a coolant supply source, the pressure of the coolant flow may be preserved. Prior cooling systems provided a flow that directly impinged on a target part, resulting in a significant pressure drop or loss of momentum in the coolant flow. With such reduced coolant flow, prior art parts may experience sustained heat exposure, heat stress, and potential cracking.

With the disclosed diffuser, however, the flow is smoothly guided along the curved surface of the diffuser, greatly reducing the pressure drop of the coolant flow and conserving its momentum. Thus, the diffuser has the ability to distribute a flow to larger areas of the target part, thereby providing a more efficient cooling system using a minimal amount of coolant flow.

While the foregoing detailed description has been given and provided with respect to certain specific embodiments, it is to be understood that the scope of the disclosure should not be limited to such embodiments, but that the same are provided simply for enablement and best mode purposes.

The breadth and spirit of the present disclosure is broader than the embodiments specifically disclosed and encompassed within the claims appended hereto.

What is claimed is:

1. A feed diffuser for supplying a flow of coolant to a surface of a liner, comprising:
    a base disposed orthogonal to a the flow of coolant;
    a body extending from the base toward the flow;
    an apex provided at a termination of the body in a direction toward the flow, the body directing the flow of coolant radially outwardly along the surface of the liner, relative to a central axis of the body; and
    a plurality of spacers extending from the base, the spacers configured to mount the base to the liner at a distance from the liner, the liner having effusion holes.

2. The feed diffuser of claim 1, wherein a surface of the body converges from the base to the apex for smoothly diffusing the flow.

3. The feed diffuser of claim 2, wherein the surface of the body has a concave shape.

4. The feed diffuser of claim 1, wherein the base has a generally circular shape.

5. The feed diffuser of claim 4, wherein the apex is a conical point.

6. The feed diffuser of claim 5, wherein the apex and a center of the base are aligned with a central axis of the flow.

7. The feed diffuser of claim 1, wherein the base is mounted on the surface of the liner.

8. The feed diffuser of claim 1, wherein the flow exits from a coolant supply tube situated within a pressure sheet.

9. The feed diffuser of claim 8, wherein the pressure sheet and the liner define a plenum for coolant air flow.

10. A system for providing flow of coolant to a surface of a liner, comprising:
    a coolant supply source configured to provide a flow of coolant in an orthogonal direction onto the liner; and
    a diffuser having a body with a downstream end mounted on the liner and an upstream end facing the flow of coolant, the diffuser increasing in cross-sectional area from the upstream end to the downstream end, the body directing the flow of coolant radially outwardly along the surface of the liner, relative to a central axis of the body; and
    a plurality of spacers extending from the base, the spacers configured to mount the base to the liner at a distance from the liner, the liner having effusion holes.

11. The system of claim 10, wherein the coolant supply source is a compressor of a gas turbine engine and the liner is a liner of a combustor of the gas turbine engine.

12. The system of claim 10, wherein the diffuser has a central axis aligned with a central axis of the flow.

13. The system of claim 10, wherein the upstream end comprises an apex, and wherein the body diverges from the upstream end to the downstream end in an arcuate shape.

14. The system of claim 12, wherein the body is concaved from the upstream end to the downstream end thereby diverting impingement of flow upon the target sheet liner.

15. A combustor, comprising:
    a shell having impingement holes;
    a liner having effusion holes extending therethough; and
    at least one diffuser mounted on the liner directly under one of the impingement holes in the shell, the at least one diffuser having a body disposed in a path of a flow of coolant, the body directing the flow of coolant radially outwardly along the surface of the liner, relative to a central axis of the body; and
    a plurality of spacers mounting the at least one diffuser to a surface of the liner at a distance from the surface of the liner so as to prevent blockage of the effusion holes in the liner.

16. The combustor of claim 15, wherein the at least one diffuser smoothly diffuses a flow from the impingement hole.

17. The combustor of claim 16, wherein the at least one diffuser has a generally arcuate shape.

18. The combustor of claim 15, wherein the at least one diffuser decreases in cross-sectional area from a base to an apex.

* * * * *